Patented Jan. 22, 1935

1,988,914

UNITED STATES PATENT OFFICE 1,988,914

TRACING CLOTH AND PROCESS FOR MAKING THE SAME

Knud Murck, Brooklyn, N. Y., assignor to Charles Bruning Company, Inc., a corporation of New York No Drawing. Application July 20, 1933 Serial No. 681,327

8 Claims. (Cl. 91—70)

The present invention relates to tracing cloth and the process of making the same.

Tracing cloths as heretofore proposed have either both surfaces which are glazed, shiny, and of a high gloss or one surface which is glazed, shiny, and of high gloss while the other surface is somewhat duller in glaze and gloss but shiny. In the use of such tracing cloths for the production of a relief suitable for commercial reproduction purposes, for instance blue printing and the like, the tracings are made with ink upon the cloth, and it is common practice to apply a tracing powder to the surface of the tracing cloth upon which the tracing or marking is to be applied in order to make the ink take well, even though the inking is done on the less glossy surface of the tracing cloth. In many cases, however, it is desired to make tracings with pencil only, but with the tracing cloths as heretofore proposed this has been almost impossible because pencil markings do not take well on the surfaces of the tracing cloth due to their gloss or glaze. While the pencil lines may appear fairly distinct on the tracing cloth, such tracing cloth when subjected to the conventional reproduction processes as blue printing produce prints which are either totally blank or show the markings so faintly as to be practically worthless.

Accordingly, an object of the invention is to provide a tracing cloth having one or both surfaces which are dull and which will take ink and pencil markings directly with like facility and with such clearness and sharpness as to form a relief suitable for commercial reproduction purposes.

Another object of the invention is to provide a tracing cloth which without being previously treated with tracing powder is capable of taking directly the markings of ink with such clearness and sharpness as to form a relief suitable for commercial reproduction purposes.

A further object of the invention is to provide a process whereby a tracing cloth is produced which has one or both surfaces that take both ink and pencil markings clearly and distinctly and which when subjected to reproduction processes produce satisfactory prints.

Various other objects of the invention will appear as this description progresses.

Briefly stated, the process according to the present invention comprises applying to a tracing cloth an impregnating liquid consisting of a cellulose ester, a volatile organic solvent, and water, the water in said liquid being more than 2% and not exceeding 25% by volume, and thereafter drying the thus treated cloth.

In carrying out the process of this invention a solution consisting of a cellulose ester and a solvent is first formed. The cellulose ester may be a simple cellulose ester like nitrocellulose, cellulose acetate, or a mixture of the two. The solvent is preferably a volatile organic liquid which is soluble in water, which is capable of dissolving the cellulose ester or esters, and which has a boiling point sufficiently low that it evaporates at a rate such as to expose the cellulose ester or esters to the precipitating action of water or preferably a boiling point which does not exceed that of water. Volatile organic liquids which may be used are acetone, methyl acetate, methanol, primary isobutyl alcohol, propyl alcohol, isopropyl alcohol, "Dioxan" (diethylene oxide), ethylene chlorhydrin, "methyl cellosolve" (mono-methyl ether or ethylene glycol), ethyl lactate, ethyl oxybutyrate, "cellosolve" (mono-ethyl ether of ethylene glycol), "diacetone alcohol" (4-hydroxy-2 keto-4 methyl pentane), and the like. The solvent may comprise either one or a mixture of such compounds. Of the solvents aforementioned, acetone is the preferred one. An acetone solution of nitro-cellulose or cellulose acetate of viscosity 115–125 as determined by the MacMichael viscosimeter has been found to be particularly suitable for use in forming the impregnating liquid.

Next a water-solvent solution is prepared. This is done by mixing the solvent and water together in any well known manner. The solvent employed should be an organic volatile liquid which is miscible with water, which is a solvent for the cellulose ester contained in the solvent cellulose ester solution above described, and which preferably has a boiling point that does not exceed that of water. The solvent may be one or a mixture of the solvents which may be used in the making of the cellulose ester solution. Then again, the selected solvent may be the same or different specific solvent or mixture of solvents which is or are employed in forming the cellulose ester solution. Of the solvents previously mentioned it is preferred to use acetone, although it is to be understood that any of the other enumerated solvents or mixtures thereof may be used with satisfactory results.

The cellulose ester solution is then added slowly and with constant agitation to the water-solvent solution to thereby form the impregnating liquid. Preferably, in forming such liquid the two solutions should be mixed in the manner described. The liquid thus formed is applied to the tracing cloth in any suitable manner, as for example, by spraying, dipping, or by passing the cloth therethrough, and the treated cloth then dried in any known manner.

In making the impregnating liquid it is important that the proportions of the three ingredients, namely, cellulose, ester-solvent solution, water, and solvent, be so selected that the final impregnating liquid contains water in an amount of more than 2% but not exceeding 25% by volume. An impregnating liquid which produces a satisfactory tracing cloth with frosted surfaces having the desired properties herein above described, may be obtained by mixing the three ingredients in the following approximate percentages:

|   |   | Per cent |
|---|---|---|
| 1. | Cellulose ester solution | 18.2 to 21 |
|   | Water | 5.3 to 18.2 |
|   | Solvent | 63.6 to 73.7 |
| 2. | Cellulose ester solution | 5.8 to 36 |
|   | Water | 8 to 11.8 |
|   | Solvent | 56 to 82.4 |
| 3. | Cellulose ester solution | 3.7 to 20 |
|   | Water | 3.7 to 20 |
|   | Solvent | 60 to 92.6 |
| 4. | Cellulose ester solution | 4.2 to 23.5 |
|   | Water | 2.1 to 11.8 |
|   | Solvent | 64.7 to 93.7 |
| 5. | Cellulose ester solution | 62.5 |
|   | Water | 25 |
|   | Solvent | 12.5 |

Preferably, an impregnating liquid composed of 20% by volume, of cellulose ester solution, 10% by volume of water, and 70% by volume of solvent, is used.

As a specific exemplification of the present invention the following is given:— First, a solution of viscosity 117 as determined by the MacMichael viscosimeter of 16 ounces per gallon of nitrocellulose in acetone is prepared. Next, a solution is prepared consisting of 70% by volume of acetone and 10% by volume of water. To the acetone-water solution is added 20% by volume of the acetone-nitrocellulose solution slowly and with constant stirring. The two solutions form an impregnating liquid which is applied to the tracing cloth in any suitable manner, as for instance, by passing the cloth through the liquid, and the impregnated cloth then dried.

Acetone is soluble in water, but nitrocellulose is not. By mixing the acetone and water together and then adding to this solution the solution of nitrocellulose in acetone in the proportions specified, there is sufficient acetone present to keep the nitrocellulose in solution in spite of the water. When the tracing cloth is treated with the resultant liquid, the first action or effect is that the water in the liquid tends to soften and dissolve the filling material in the interstices of the cloth, generally a starch composition. Then, as the cloth proceeds through a drying box, this action or effect continues, but a new action or effect also begins. The heat in the drying box causes the water and acetone to evaporate gradually from the wet film, leaving the non-volatile nitrocellulose and the partially dissolved filling material behind. Acetone is very volatile and evaporates out of the film more rapidly than the water, thereby exposing the nitrocellulose to the precipitating action of the water, and when the drying is complete, the nitrocellulose has all been deposited on the surface of the cloth, in the form of minute particles intimately mixed and embedded in the redeposited cloth filling which was at first softened and partially dissolved.

The product thus obtained is a tracing cloth which is only negligibly more waterproof than plain tracing cloth and which has dull frosted surfaces that are admirably adapted to take markings of pencil and ink. Pencil or ink tracings made on this new tracing cloth make perfect blue prints and the like.

This application is a continuation in part of my application Serial No. 398,816, filed October 10, 1929.

Having thus described the invention, what is claimed as new and desired to be secured by Letters Patent is:

1. The process of making tracing cloth which consists in applying to a tracing cloth an impregnating liquid consisting of a cellulose ester, a volatile organic solvent having a boiling point sufficiently low that it evaporates at a rate such as to expose the cellulose ester to the precipitating action of water, and water, the water in said liquid being more than 2% and not exceeding 25%, and thereafter drying the thus treated cloth at a sufficiently low temperature to obtain a dull frosted film.

2. The process of making tracing cloth which consists in applying to a tracing cloth an impregnating liquid consisting of a simple cellulose ester, a volatile organic solvent having a boiling point sufficiently low that it evaporates at a rate such as to expose the cellulose ester to the precipitating action of water, and water, the water in said liquid being more than 2% and not exceeding 25%, and thereafter drying the thus treated cloth at a sufficiently low temperature to obtain a dull frosted film.

3. The process of making tracing cloth which consists in applying to a tracing cloth an impregnating liquid consisting of approximately 20% of a simple cellulose ester, 10% of water, and 70% of a volatile organic solvent, and thereafter drying the thus treated cloth at a sufficiently low temperature to obtain a dull frosted film.

4. The process of making tracing cloth which consists in applying to a tracing cloth an impregnating liquid consisting of approximately 20% of nitrocellulose, 10% of water, and 70% of acetone, and thereafter drying the thus treated cloth at a sufficiently low temperature to obtain a dull frosted film.

5. An article of manufacture, a tracing cloth produced by the process of claim 1, characterized by surfaces which are capable of taking directly the markings of pencil and ink with such clearness and sharpness as to form a relief suitable for commercial reproduction purposes.

6. An article of manufacture, a tracing cloth produced by the process of claim 4, characterized by surfaces which without being previously treated with tracing powder are capable of taking directly the markings of pencil and ink with such clearness and sharpness as to form a relief suitable for commercial reproduction purposes.

7. The process of making tracing cloth which consists in applying to a tracing cloth an impregnating liquid consisting of a simple cellulose ester, a volatile organic solvent having a boiling point sufficiently low that it evaporates at a rate such as to expose the cellulose ester to the precipitating action of water, and water, the water in said liquid being about 10%, and thereafter drying the thus treated cloth at a sufficiently low temperature to obtain a dull frosted film.

8. An article of manufacture, a tracing cloth produced by the process of claim 7, characterized by surfaces which are capable of taking directly the markings of pencil and ink with such clearness and sharpness as to form a relief suitable for commercial reproduction purposes.

KNUD MURCK.